US010181082B2

(12) United States Patent
Serre et al.

(10) Patent No.: US 10,181,082 B2
(45) Date of Patent: Jan. 15, 2019

(54) METHOD AND SYSTEM FOR AUTOMATED BEHAVIOR CLASSIFICATION OF TEST SUBJECTS

(71) Applicant: Brown University, Providence, RI (US)

(72) Inventors: Thomas Serre, East Greenwich, RI (US); Youssef Barhomi, Arlington, MA (US); Zachary Nado, Mystic, CT (US); Kevin Bath, Rumford, RI (US); Sven Eberhardt, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 167 days.

(21) Appl. No.: 15/424,922

(22) Filed: Feb. 6, 2017

(65) Prior Publication Data

US 2018/0225516 A1 Aug. 9, 2018

(51) Int. Cl.
*G06K 9/00* (2006.01)
*G06K 9/66* (2006.01)
*G11B 27/031* (2006.01)
*G06N 3/08* (2006.01)

(52) U.S. Cl.
CPC ..... *G06K 9/00718* (2013.01); *G06K 9/00335* (2013.01); *G06K 9/00362* (2013.01); *G06K 9/00771* (2013.01); *G06K 9/66* (2013.01); *G06N 3/08* (2013.01); *G11B 27/031* (2013.01)

(58) Field of Classification Search
CPC ......... G06T 7/0012; G06T 2207/10081; G06T 11/006; G06T 7/0081; G06T 2207/10116; G06T 2207/30004; G06T 5/40; G06T 2207/30068; G06T 7/0085; G06T 7/60; G06T 1/20; G06T 17/20; G06T 1/60; A61B 6/032; A61B 5/02007; A61B 5/7264; A61B 5/742; G06K 9/4604; G06K 9/52; G06K 9/6267; G06K 9/66; G06K 9/00718; G06K 9/00335; G06K 9/00362; G06K 9/00771; G06F 9/5044; G06F 17/5018; G06F 2217/16; G06N 3/08; G11B 27/031
See application file for complete search history.

(56) References Cited

U.S. PATENT DOCUMENTS

| 2014/0347475 | A1* | 11/2014 | Divakaran | G06K 9/00771 348/135 |
| 2015/0264272 | A1* | 9/2015 | Burns | G11B 27/10 386/201 |
| 2016/0117547 | A1* | 4/2016 | Hanina | G06K 9/00335 382/118 |

* cited by examiner

*Primary Examiner* — Duy M Dang
(74) *Attorney, Agent, or Firm* — Barlow, Josephs & Holmes, Ltd.

(57) ABSTRACT

The method and system includes a plurality of test subject containers, each having a test subject therein. A plurality of video cameras is focused on the test subject containers to capture video of the behavior of each of the test subjects. The system and method also includes a storage system for storing the plurality of video from the cameras. The storage system may be local or cloud-based as is known in the art. The system further has one or more computers with a neural network configured to (a) retrieve the video from the storage system of the test subjects, (b) analyze the video to identify a plurality of observable behaviors in the test subjects, (c) annotate the video with the observed behavior classifications, and (d) store the annotated video in the storage system.

18 Claims, 17 Drawing Sheets

(a) drink
 (b) eathand
 (c) eat
 (d) Groom
 (e) Hang
 (f) rear
 (g) rest
 (h) sniff
 (i) walk

METHOD AND SYSTEM FOR AUTOMATED BEHAVIOR CLASSIFICATION OF TEST SUBJECTS

BACKGROUND

1. Technical Field

The present disclosure relates generally to neural networks and image recognition and more specifically, to a convolution neural network configured to identify and automate labeling of behavior in video of test subjects, such as mice, zebrafish, birds and crickets.

2. Background of the Related Art

As the digitalization of society increases so does the amount of data available and the need to process it. This is best seen in the scientific community with studies that have grown in scale to where it would be unreasonable for humans alone to analyze all of the information produced. As computer vision techniques improve in accuracy and efficiency scientists can use them more often in their research, including autism diagnosis, medical diagnosis, and animal behavioral analysis. These are all examples of areas where computer vision could improving the productivity of scientific study.

Behavioral analysis of test subjects is a process that is a bottleneck in many areas of science, but especially in biomedical research. Until recently humans were vital to the data gathering process. They would typically watch many hours of footage or comb through many pages of records, an error prone and laborious process that was still central to the experiments. An example of this bottleneck is that it currently takes twenty five minutes of human analysis to analyze one minute of mouse behaviors. With the experiments in the lab there are several dozen streams of continuous footage being recorded, generating far too much data for humans to process in a reasonable time.

Animal behavioral analysis is being used more frequently for varying fields of research and the need for automating its monitoring and analysis is growing rapidly. While it is useful for many fields of science including ecology, neuroscience, psychology, and pharmacology it is only recently that computer vision techniques have been developed to create truly robust systems.

Many animal species are commonly used in experiments. For example, rodents are very popular for modeling neurological functions in mammals, and zebrafish are often involved in pharmacology and genetic research. Previously these studies required special hardware in order to record animal activity or the studies relied upon human observation. While there has been work in automating these practices with computer vision, often times the algorithms are very problem dependent and susceptible to failure from small changes in the experimental setup. For example, the current classification system relies on background subtraction methods that many times must be tuned to the specific environment.

Accordingly, there is a perceived need in the industry for an improved system of automating behavior classification of test subjects that more robustly and accurately labels behavior classifications of the test subjects.

SUMMARY

The present disclosure solves the problems of the prior art by providing a method and system to capture and annotate video of test subjects with an improved degree of behavior classification accuracy. The models discussed in this disclosure perform at human level accuracy and take approximately twelve seconds to process one minute of video, indicating there is great opportunity for automation in this area.

The method of automated behavior classification of a plurality of test subjects includes providing video of a test subject. Annotating the video of the test subject with a plurality of behavior classifications corresponding to a behavior of a test subject in the video at a point in time, thereby creating annotated video. Storing the annotated video. Training a neural network with the previously annotated video to identify a relationship of the test subject in the video with the annotated behavior classification for that test subject at that point in time in the annotated video. With the trained neural network, it is then possible to rapidly classify behavior of a plurality of test subjects form a plurality of video.

Once trained, the neural network, is able to identify the observed behaviors of the test subjects in the video and annotate the time the observed behavior occurred, thereby creating an annotated video. The annotated video may then be stored for future reference.

Consequently, a system according to the invention includes a plurality of test subject containers, each having a test subject therein. A plurality of video cameras are focused on the test subject containers to capture video of the behavior of each of the test subjects. The system also includes a storage system for storing the plurality of video 8 from the cameras. The storage system may be local or cloud-based as is known in the art. The system further has one or more computers with a neural network configured to (a) retrieve the test subject video from the storage system, (b) analyze the video to identify a plurality of observable behaviors in the test subjects, (c) annotate the video with the observed behavior classifications, and (d) store the annotated video in the storage system.

The neural network may include one or more convolution layers with interspersed pooling layers, followed by one or more fully connected layers. A recurrent layer may be included in addition to or in lieu of a fully connected layer. Further one or more streams of data may be processed, such as shape data and motion data separately, prior to concatenation to improve or inform behavior classification accuracy.

As a result, the system and method can adapt to the study's environment, and therefore it should not have the current difficulties of adapting to experimental fluctuations or, given new data, generalizing to new types of experiments. Instead of relying on multiple stages of analysis such as background subtraction, feature extraction, and classification, it will be able to learn a single end-to-end classification system. Accordingly, in addition to increasing the robustness of setups, it will also be easier for scientists that do not have as much knowledge about computer vision to feed their data into a deep learning black box rather than develop a novel pipeline for each of their studies.

BRIEF DESCRIPTION OF THE DRAWINGS

These and other features, aspects, and advantages of the present invention will become better understood with reference to the following description, appended claims, and accompanying drawings where:

FIG. 18 is a confusion matrix for the shape model combined with motion and position features, initialized with convolution layer weights from a pre-trained AlexNet network;

FIG. 19 is a confusion matrix for the shape LSTM model initialized with convolution layer weights from a pre-trained AlexNet network; and FIG. 20 is a confusion matrix for the LSTM model with shape, motion and position features initialized with convolution layer weights from a pre-trained AlexNet network.

DESCRIPTION OF THE PREFERRED EMBODIMENT

Figure 1:
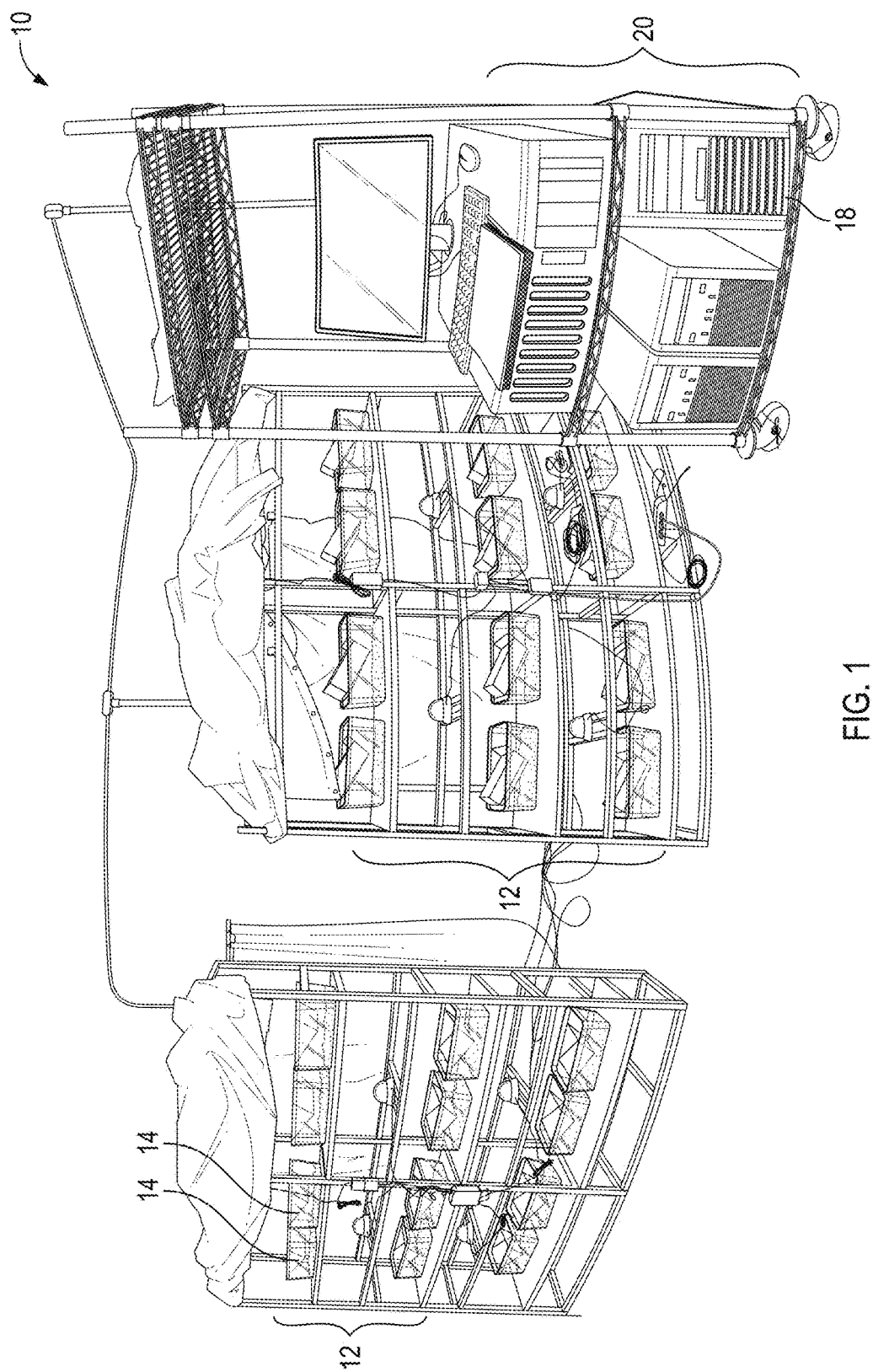
FIG. 1 shows an exemplary embodiment of the system for automated classification of behavior in test subjects.
Figure 2:
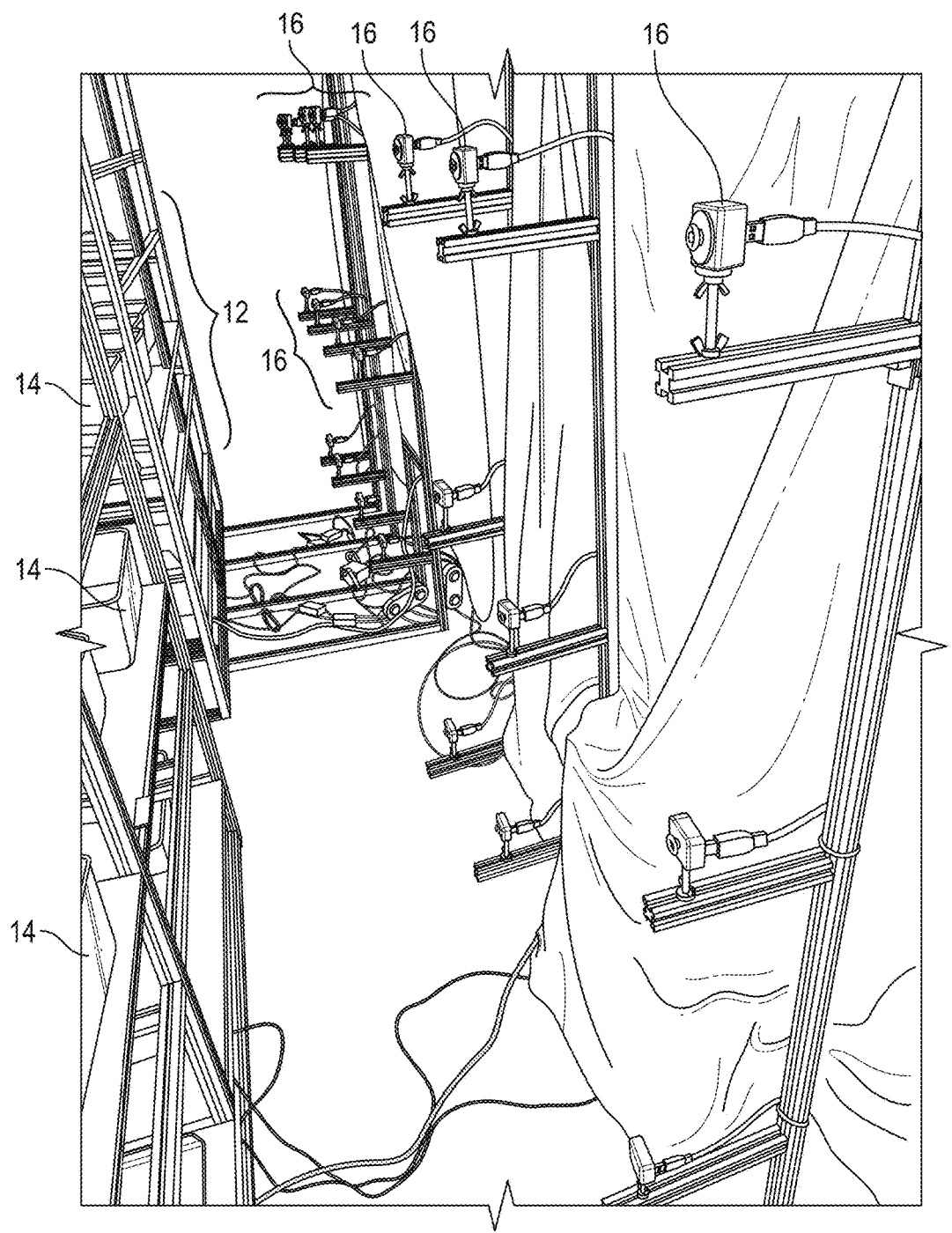
FIG. 2 shows an exemplary embodiment of a plurality of video cameras component of the system for automated classification of behavior in test subjects.

Referring now to FIGS. 1-2, an exemplary embodiment of the system is shown generally at 10. The system 10 includes a plurality of test subject containers 12, each having a test subject 14 therein. A plurality of video cameras 16 are focused on the test subject containers 12 to capture video of the behavior of each of the test subjects 14. A storage system 18 is provided for storing the plurality of video from the cameras. The storage system 18 may be local or cloud-based as is known in the art.

The system 10 further has one or more computers 20 with a neural network configured to (a) retrieve the test subject video from the storage system, (b) analyze the video to identify a plurality of observable behaviors in the test subjects, (c) annotate the video with the observed behavior classifications, and (d) store the annotated video in the storage system. The computers may also function as the storage system.

In an exemplary embodiment, experiments were run on several desktop computers 20 in the lab all running Ubuntu 14.04, using the Caffe deep learning framework to leverage the power of the NVIDIA Titan X GPUs in each computer 20. For the neural network trials that did not have recurrent layers, the master branch of Caffe was used, and for the remaining trials, the Long Short Term Memory ("LSTM") layer in the recurrent fork was included.

The system has an array of infrared cameras setup 16 in controlled environments that continuously record and save footage of test subjects 14, such as mice. The mice are average lab mice that have not been subjected to any previous experiments. The video data is recorded using custom software and Point-Grey Firefly cameras, stored as 30 FPS, 640×480 resolution, grayscale MP4 videos which are broken into frames to be analyzed by Caffe using FFMPEG.

Figure 3:
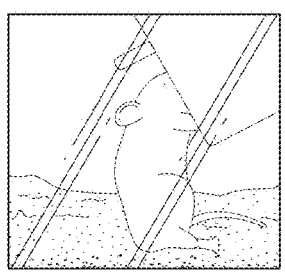
FIG. 3 shows an exemplary plurality of behaviors that may be identified and classified in a test subject, such as a mouse.
Figure 3:
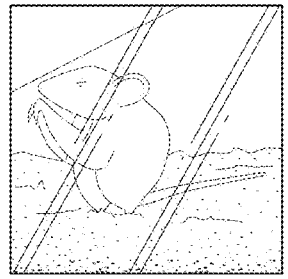
Figure 3:
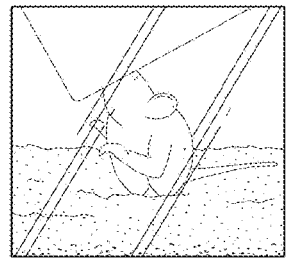
Figure 3:
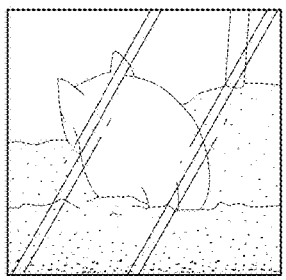
Figure 3:
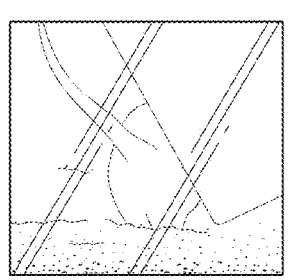
Figure 3:
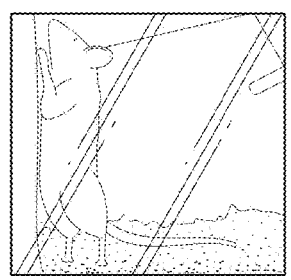
Figure 3:
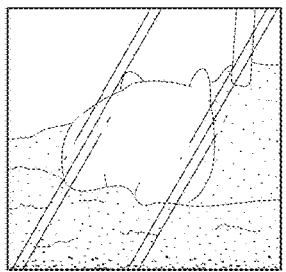
Figure 3:
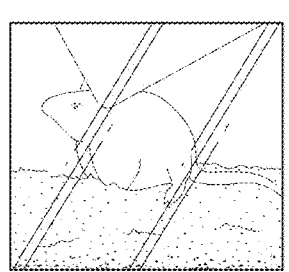
Figure 3:
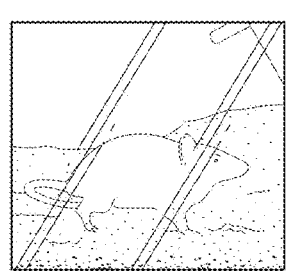

The data is annotated with behavior tags according to one of nine classes per frame: drink, eat, groom, hang sniff; rear, rest, walk, and eathand. These classes represent simple actions the mouse performs that are useful for behavioral analysis. Representative frames of each class are shown in FIG. 3.

The annotated video data is stored in the storage system 18, which may be a database as is known in the art. A no-SQL database, such as MongoDB may be used, but other database systems and architectures may be used.

The traditional definition of accuracy is the number of samples that were correctly labelled divided by the total number of samples. While this is a valid measure, it is not as effective for datasets that have very uneven distributions of classes. The classification systems developed in this paper are better analyzed with balanced accuracy; this is defined as the average of the per-class accuracies, which gives more weight to classes that are underrepresented in the data. For example, in the training and validation dataset the rest and eathand classes each represent more than 25% of the data, while drink and walk classes each occur less than 1% of the time.

Another metric considered in the assessment of model accuracies is the ability for humans to agree on classifications. Several of the classes are defined by the type of small movements the mouse is making, and many times humans have difficulty deciding exactly what kind of motion is occurring. Additionally sometimes the mouse is performing many actions simultaneously which leads to further discrepancies and has motivated an effort to redefine the classification framework. Labelling disagreements between humans have shown there is only an approximately 80% human agreement for the same videos in the datasets. This sets the target accuracy for the models, because even if the model achieves a higher accuracy on one video in general this is the level at which humans can consistently annotate.

In order to see how effective recurrent architectures are a convolutional only model is trained without a recurrent layer for comparison. AlexNet is a CNN that is often times the basis for many convolutional architectures. It was among the first papers to clearly demonstrate the power of deep learning combined with GPU computing architectures. It uses a technique called dropout, a popular method for preventing overfitting that works by randomly removing neurons from a network at any given training iteration. It does this in an attempt to make a model that is more robust by forcing it to learn weights and biases that are not as dependent on other activations. Using dropout and rectified linear units (ReLU) amongst other techniques, AlexNet achieved winning top-1 and top-5 error rates at the ILSVRC-2012 image classification competition.

Figure 4:
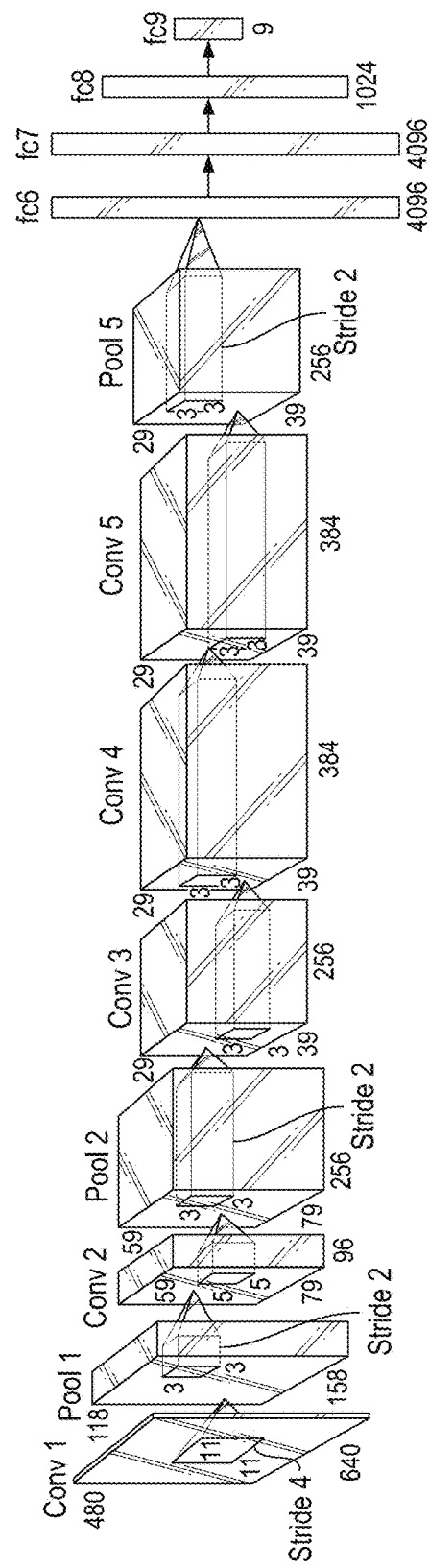
FIG. 4 shows an illustration of a first exemplary embodiment of a convolution neural network that may be used in the system for automated classification of behavior in test subjects.

As shown in FIG. 4, the model is similar to the original AlexNet; there are five convolutional layers (abbreviated cony) using the original filter and output sizes with pooling in between to learn spatial features (abbreviated as pool), followed by several fully connected layers (abbreviated $f_C$). All neurons are rectified linear units (ReLU), but batch normalization was used instead of local response normalization after the pool1 and pool2 layers; this has been shown to improve learning rates and removes the need of dropout neurons. There is also an additional fully connected layer added before the final output layer, so that features could be extracted at this layer to use in other classifiers. This is referred to this as the shape model.

The current classification system saw a noticeable improvement when using position features of the mouse compared to its motion-only alone. In order to see how much explicit position information affects the performance of the neural networks the pre-computed position features from the current system are taken for use in the new models. Position and velocity are diagnostics for many of the actions used, especially when the mouse is resting and eating. Eating is always defined as when the mouse is touching the feeder spout, so a classifier will have a much easier time if given the explicit position information compared to having to extract and learn it. Position features were inserted into the CNN by concatenating them to the fc8 layer in FIG. 4.

Figure 5:
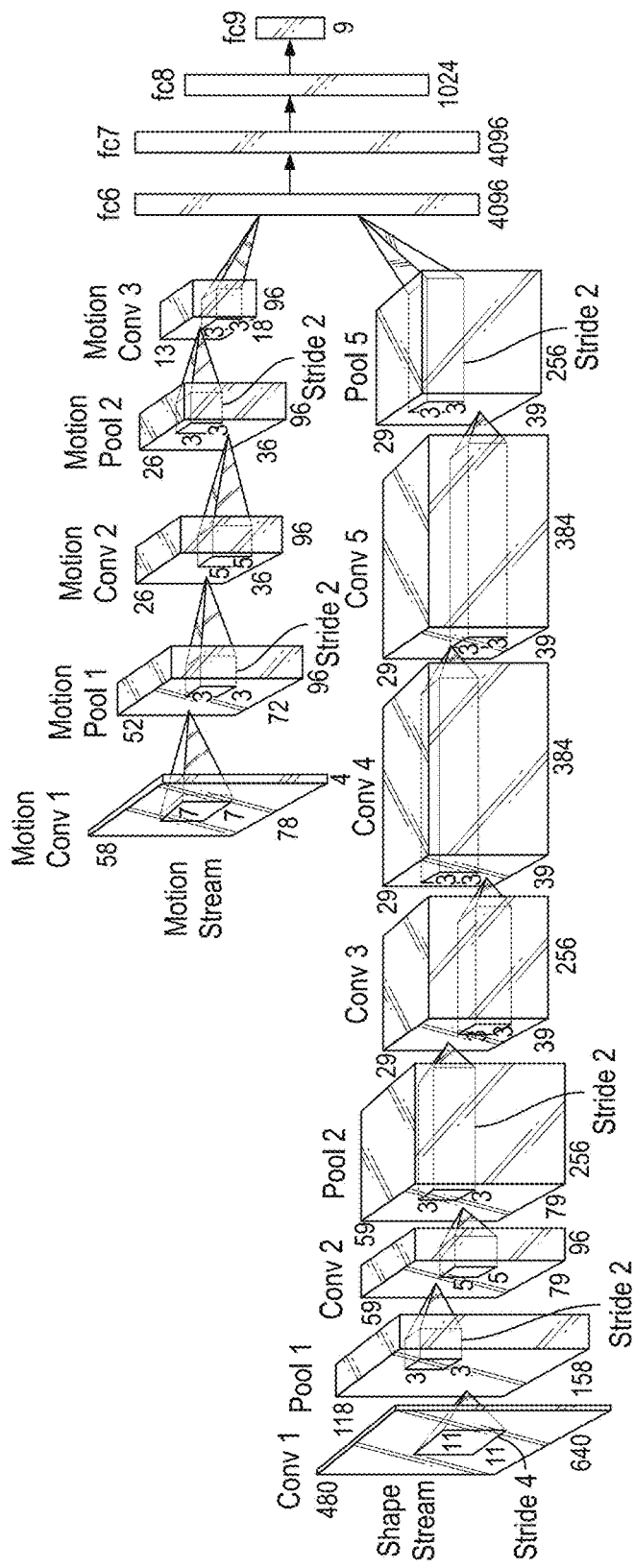
FIG. 5 shows an illustration of a second exemplary embodiment of a convolution neural network that may be used in the system for automated classification of behavior in test subjects.

The other type of features used in the current classification system is a hierarchy of motion features generated starting from spatial-temporal Gabors in several orientations. While these are hard-coded into the HMAX system, in order to use these in the neural network models the architecture was modified to that of in FIG. 5.

The motion stream uses four orientations of Gabor filters that convolve over nine frames at a time to produce a single motion image, which is then used as input for a condensed version of the shape stream from the CNN. In practice the motion images were precomputed due to the format that the data is read in by the deep learning framework, so the network definition starts at the Motion Conv1 layer. The two-dimensional outputs from the motion and shape streams are then flattened and concatenated before being sent to fc6. Some actions that the CNN has difficulty classifying are very dependent on motion, such as when the mouse is grooming or sniffing; the only difference is small movements in particular parts of the mouse that shape alone has difficulty conveying.

A common practice with neural networks is to load weight and bias values from networks that have already been trained on large sets of data relevant to the purpose of the model. The intuition is that if they have been exposed to a large amount of data then they will already have parameter values that are general enough to apply to the particular purpose of the model, and when new training data is given to the network it will fine tune the model for the given dataset.

A common set of weights and biases to use are from AlexNet trained to iteration 310,000 on the ImageNet dataset. The parameters for the convolutional layers from the pre-trained model were used as initializations for the equivalent layers in the new models, while the fully connected layers' parameters were initialized from Gaussian distributions.

Figure 6:
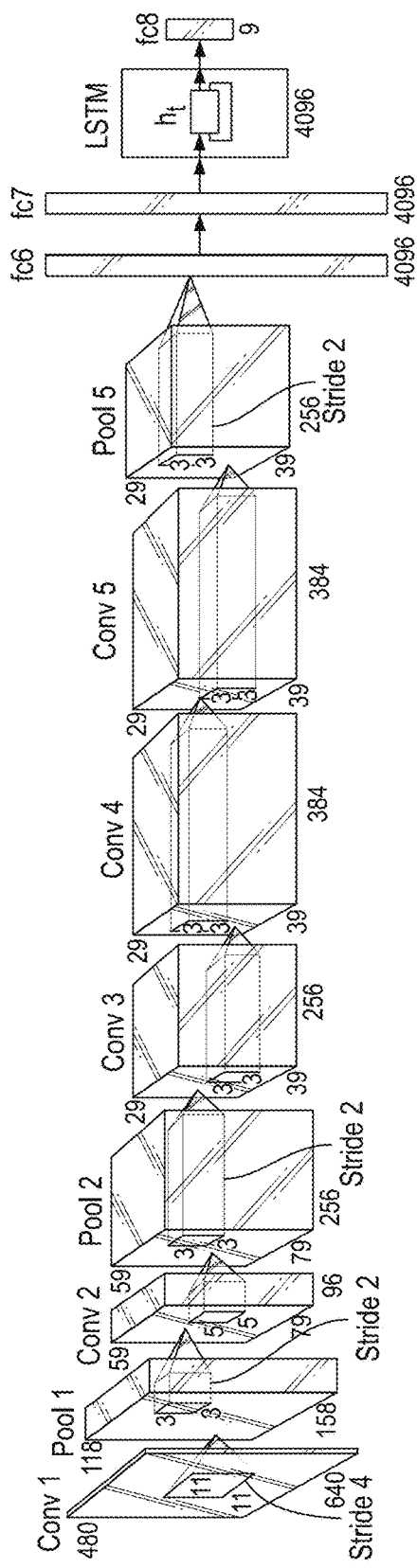
FIG. 6 shows an illustration of a third second exemplary embodiment of a convolution neural network with a recurrent neural network layer that may be used in the system for automated classification of behavior in test subjects.

In order to better replicate past results a recurrent neural network on top of the convolutional model was used to learn a relationship across time. Particularly, an LSTM layer was used in order to avoid unstable gradient issues that often plague recurrent architectures. As seen in FIG. 6, it is very similar to the shape model except there is a recurrent layer between the second (fc7) and third (fc8) fully connected layers.

As with the shape model, different feature combinations with the LSTM models were also tested. However now there were two possibilities for concatenating position features, to a fully connected layer before or after the LSTM layer. Motion features were incorporated into the LSTM model the same way as with the shape model in FIG. 5 except with an LSTM layer instead of fc8.

Deep learning models often have many hyper-parameters that require careful tuning, such as those that control learning rate, parameter updates, and normalization. There has been a great deal of work in developing improvements to these elements including batch normalization, gradient clipping, and sophisticated learning rate policies; these were all tested and tuned to improve the learning efficiency and validation accuracy of the models.

Until recently many neural network models used local response normalization (LRN) which normalizes activation function outputs across different output maps; for example, in a convolutional layer that produces many output maps the activations in each map at coordinates (i,j) would be normalized across all maps. This was inspired by the lateral inhibition in neurons observed in the brain, and prevents any one map from producing activations that overwhelm others so that their effect on learning is not mitigated. However in 2015 a paper was published detailing batch normalization. Batch normalization works by normalizing all samples in a mini-batch so that inputs to neurons from different mini-batches are from the same distribution; this makes it easier for them to learn because they do not have to constantly adapt their parameters to different ranges of values during training.

Figure 7:
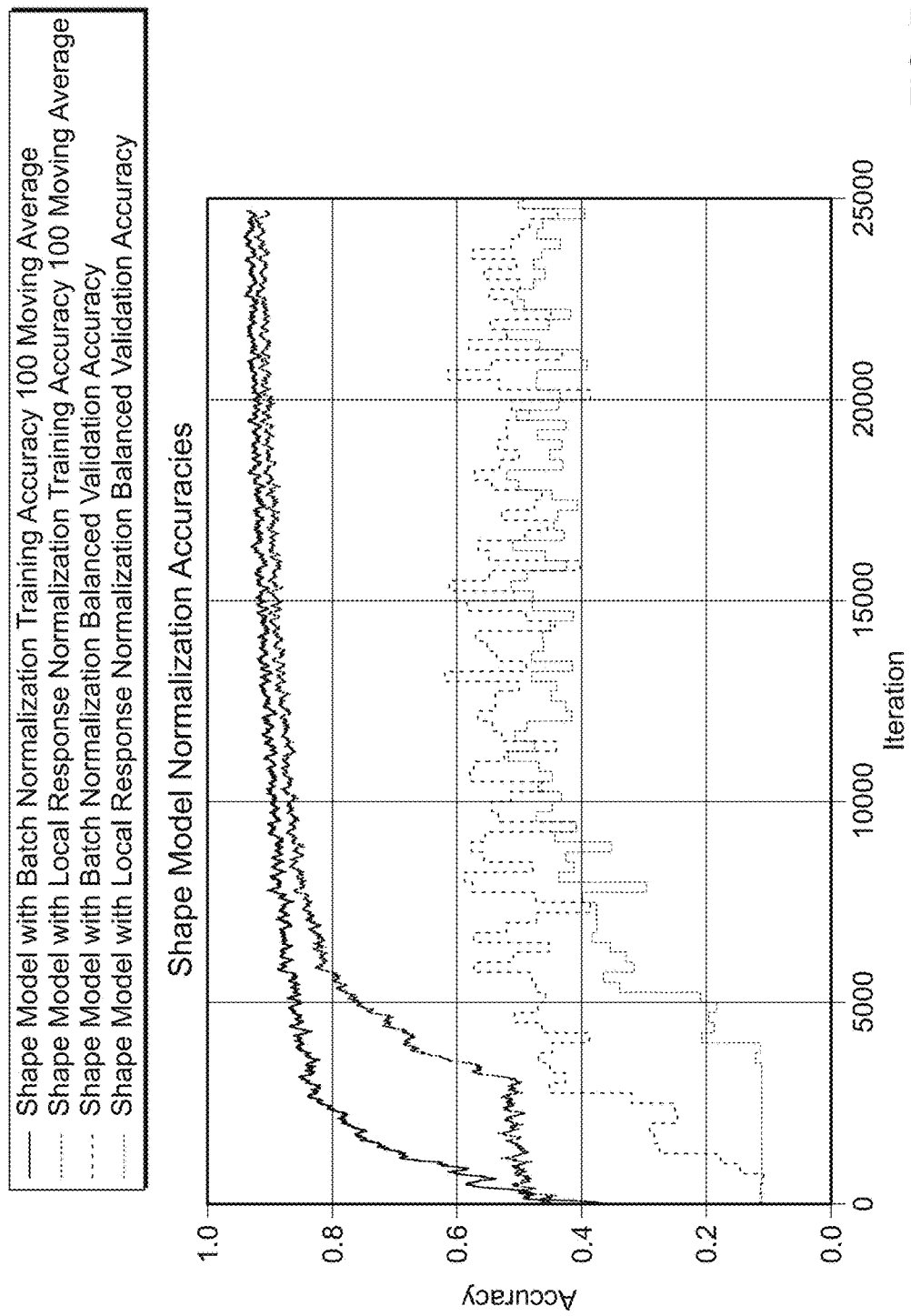
FIG. 7 is a chart illustrating using batch normalization and removing dropout neurons to speedup model learning.

Using batch normalization and removing dropout neurons, a significant speedup in model learning in observed as seen in FIG. 7.

When training neural networks, the model error is minimized using a numerical solver such as stochastic gradient descent ("SGD"). SGD works by using the gradient of the model error with respect to the parameters to adjust each parameter in a way that reduces the overall error. The basic equation for the weights of layer L is $$w_L = w_L - \frac{\eta}{N} \sum_i \frac{\partial E_i}{\partial w_L}$$

where $\eta$ is the learning rate hyper-parameter, N is the batch size, and $E_i$ is the error for training example i. Note that it only calculates the change in parameters from the gradients with respect to the current mini-batch, which significantly reduces computation time compared to calculating it on the entire training population. However, often times SGD is prone to overshooting local minima in the error surface of the model because the error gradients are too large. One solution to this is to use momentum, which is a technique inspired by the physical concept that resists changes in the gradient vector by keeping a running sum of the past gradient vectors. The original SGD equation can then be modified to get $$v_L = \xi v_L - \frac{\eta}{N} \sum_i \frac{\partial E_i}{\partial w_L}$$

$$w_L = w_L + v_L$$

where $\xi$ is the momentum hyper-parameter that tunes how much the new gradient vector affects the weight updates. $\xi$ is typically between 0.9 and 0.99.

Another popular and effective solver that expands on the momentum concept is called RMSProp. The formula is similar to the momentum SGD, $$c = \mu c + (1-\mu)\left(\frac{1}{N}\sum_i \frac{\partial E_i}{\partial w_L}\right)^2$$

$$w_L = w_L + \eta \frac{\frac{1}{N}\sum_i \frac{\partial E_i}{\partial w_L}}{\sqrt{c}}$$

where c can be thought of as a running cache of the gradient vectors and $\mu$ is the cache decay rate hyper-parameter. Typical values of $\mu$ are between 0.9 and 0.999. For the new models RMSProp was much more effective than SGD as seen in FIG. 8 and FIG. 9.

Figure 8:
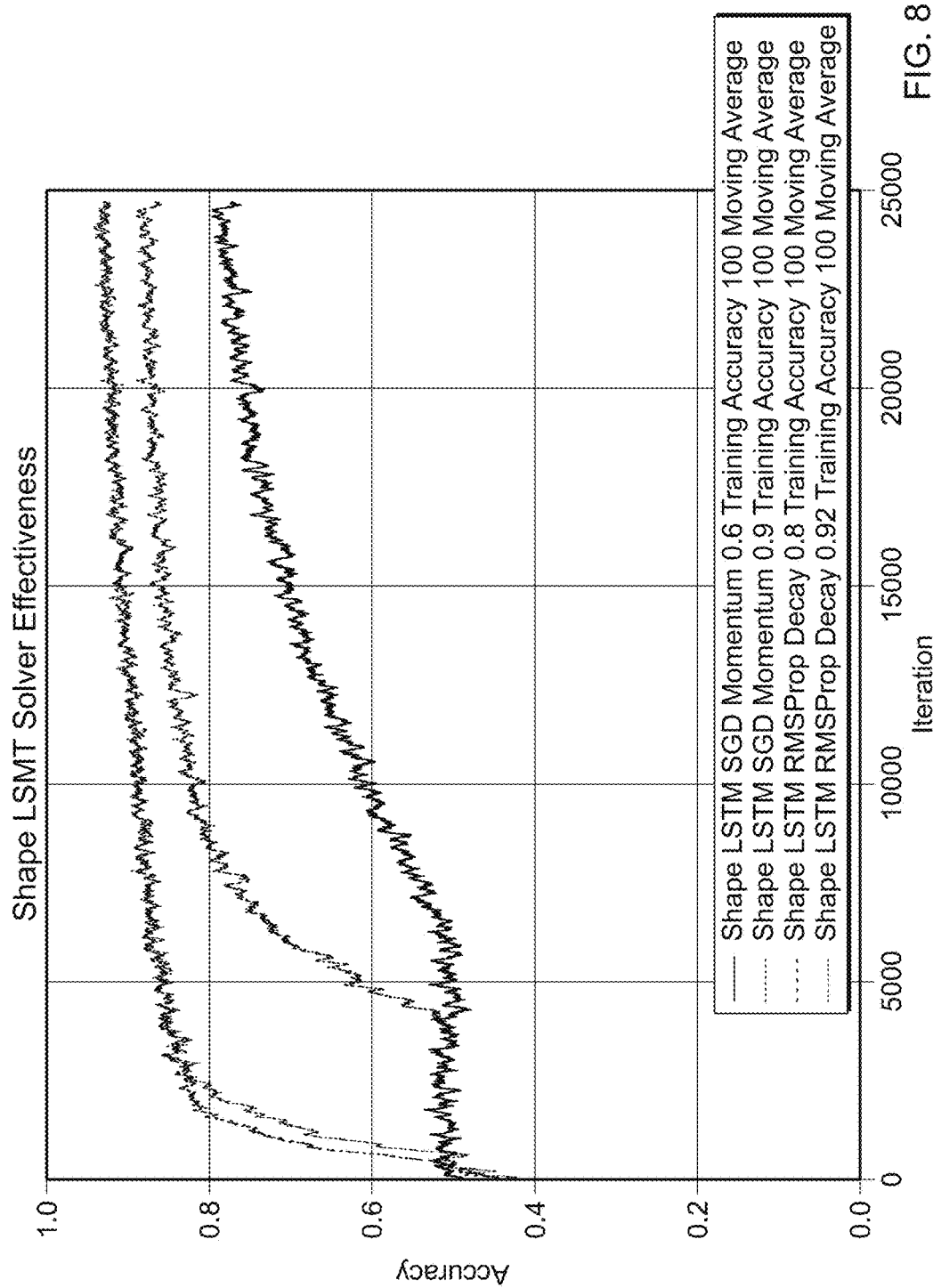
FIG. 8 is a chart illustrating LSTM solver effectiveness between SGD and RMSProp solver algorithms.

For instance, FIG. 8 shows the shape LSTM model using the SGD solver with a typical momentum value of 0.9 and a low momentum value of 0.6, and using the RMSProp solver with a typical decay rate of 0.92 and a low decay rate of 0.8. Clearly RMSProp learns more efficiently than SGD does, especially when comparing the solvers with lower hyper-parameter values.

Figure 9:
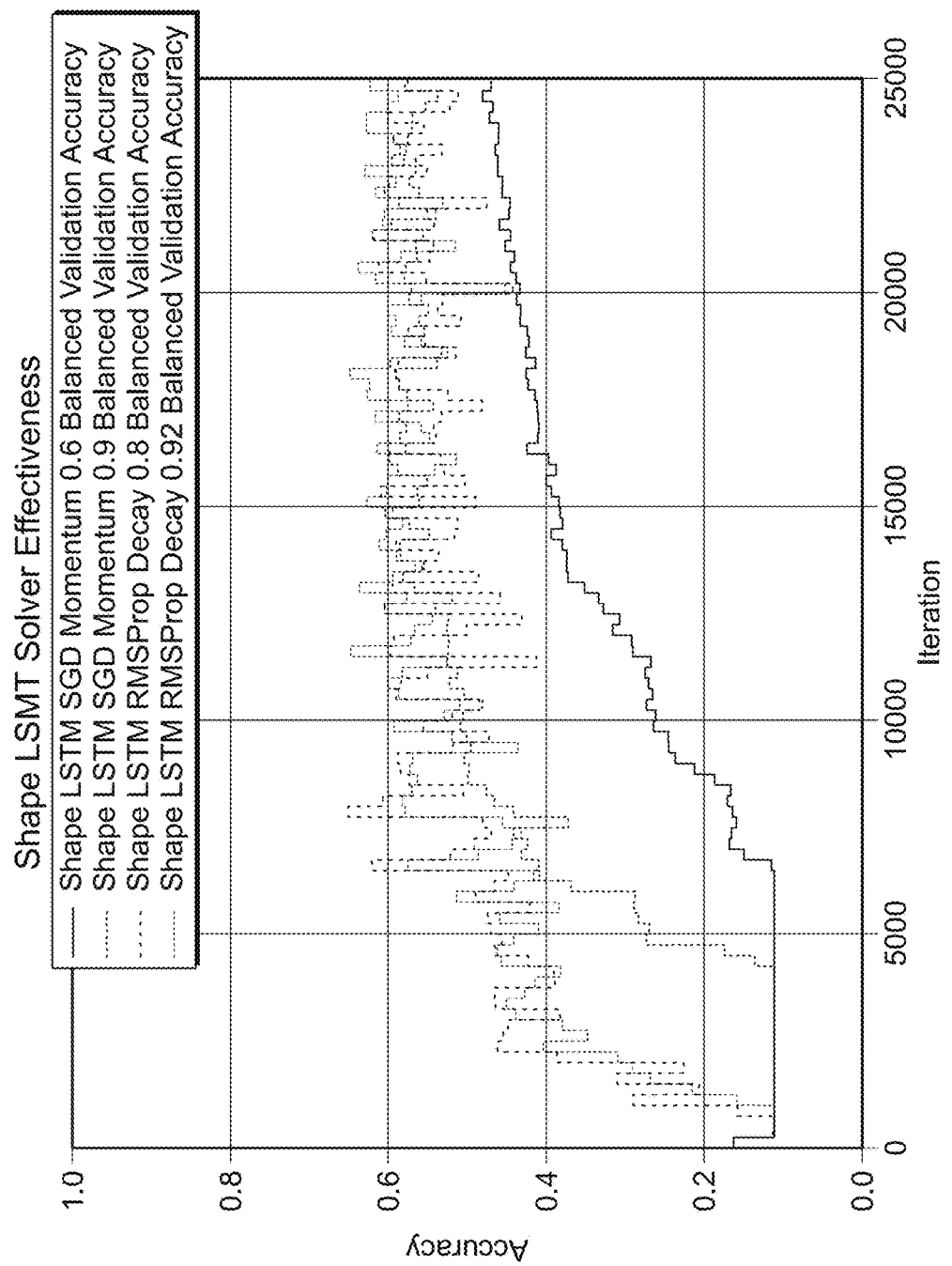
FIG. 9 is a further chart illustrating LSTM solver effectiveness between SGD and RMSProp solver algorithms.

In FIG. 9, The shape LSTM model using the SGD solver with a typical momentum value of 0.9 and a low momentum value of 0.6, and using the RMSProp solver with a typical decay rate of 0.92 and a low decay rate of 0.8. Even the lower decay rate RMSProp solver reaches a higher validation accuracy than SGD does.

The learning rate hyper-parameter $\eta$ controls how much the new error gradients affect the model parameters. While this could be a constant value, it is almost always a value that decreases with training iterations. This is so because when the model is starting it should update the parameters more to get away from the random initializations, but once it has gone through many iterations it should have found a minimum in the error surface of the model and therefore only be finely tuning the parameters.

Figure 10:
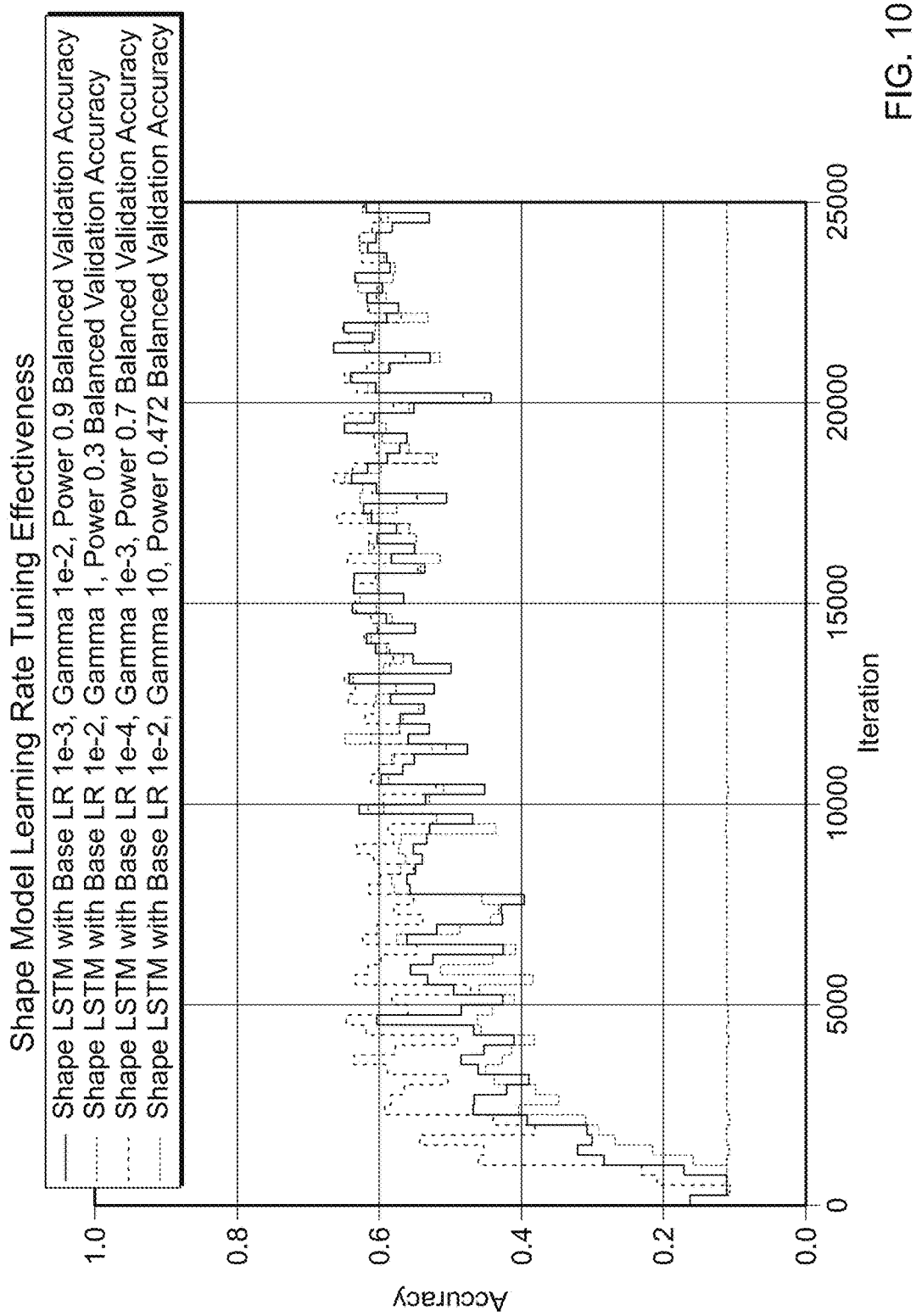
FIG. 10 is a chart illustrating shape model learning rates and training effectiveness.

FIG. 10 shows several choices of hyper-parameters for the inverse learning policy. The green line is for a set of hyper-parameters that made the learning rate too large, resulting in a model that could only predict as well as chance. The others are the result of careful tuning in order to balance learning magnitude and rate decay to achieve better performance.

An inverse learning rate policy was used as the function controlling this hyper-parameter, given by the formula $$\eta = \frac{b}{(1+\gamma t)^\epsilon}$$

where b is the base learning rate, t is the training iteration, and $\gamma$, $\epsilon$ are hyper-parameters that control the rate and shape of learning rate decay. Adjusting these hyper-parameters can have a significant impact on learning performance, as evidenced by FIG. 10.

One of the issues that many networks run into as they increase their depth is the unstable gradient problem. The basic intuition for why gradients can become unstable goes back to the derivation of the back-propagation algorithm: using the chain rule the gradient of the error with respect to any parameter in the network can be derived as a product of derivatives and parameter values. However, as the number of layers in between the parameter and the output layer increases so do the number of terms in the product. Considering the sigmoid activation function has derivatives in the range (0, ¼] and tan h activation function has derivatives that are in the range (0, 1], many of these terms can be below 1 and drive the gradient toward zero at an exponential rate. A similar argument can be made with combinations of parameter values for the case where the gradient explodes.

Figure 11:
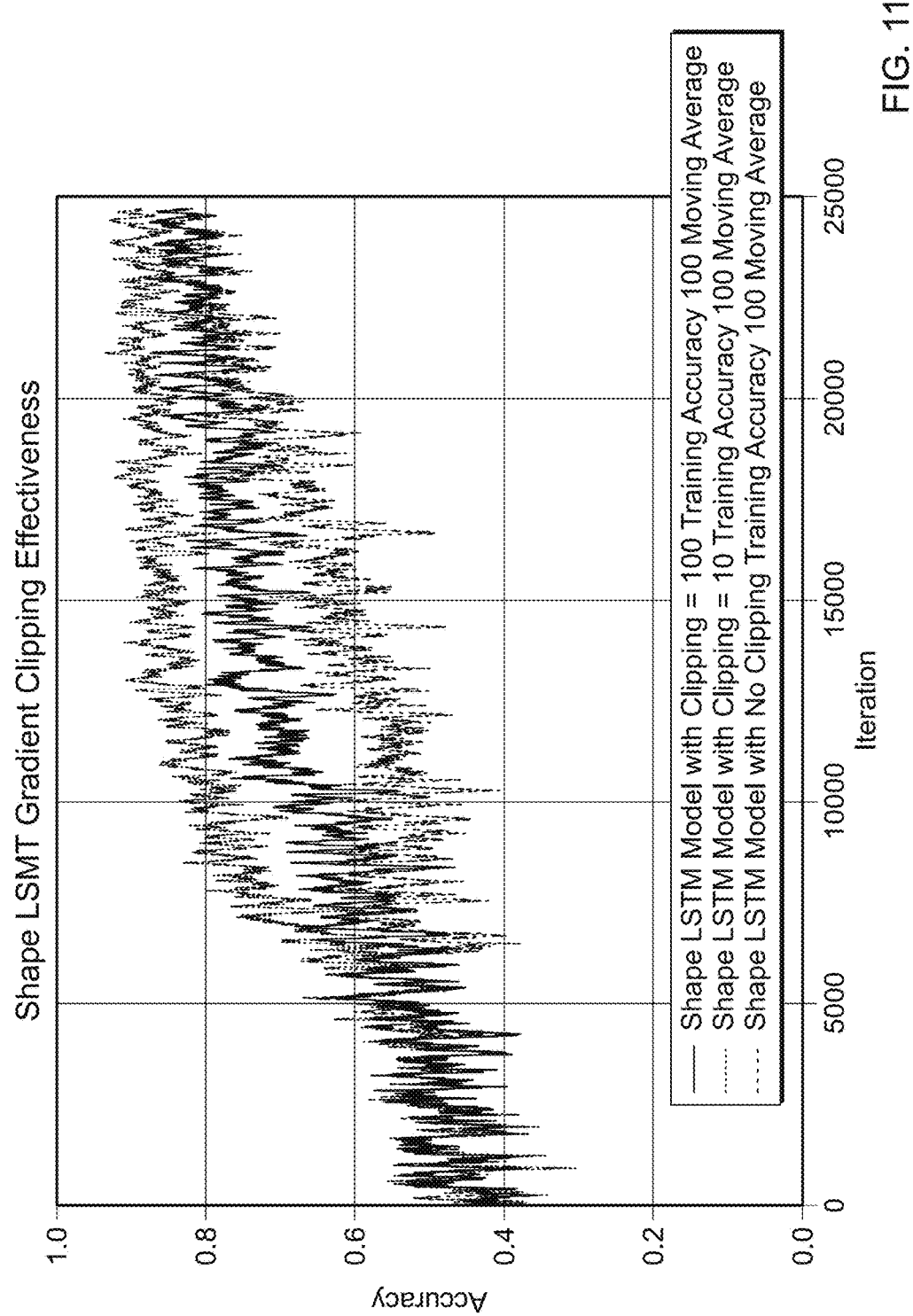
FIG. 11 is a chart illustrating shape LSTM gradient clipping effectiveness with different clipping values of the gradients.

FIG. 11 illustrates training accuracy on the shape LSTM model. By tuning the clipping value of the gradients it was able to learn much faster compared to poorly tuned or no clipping values.

Figure 12:
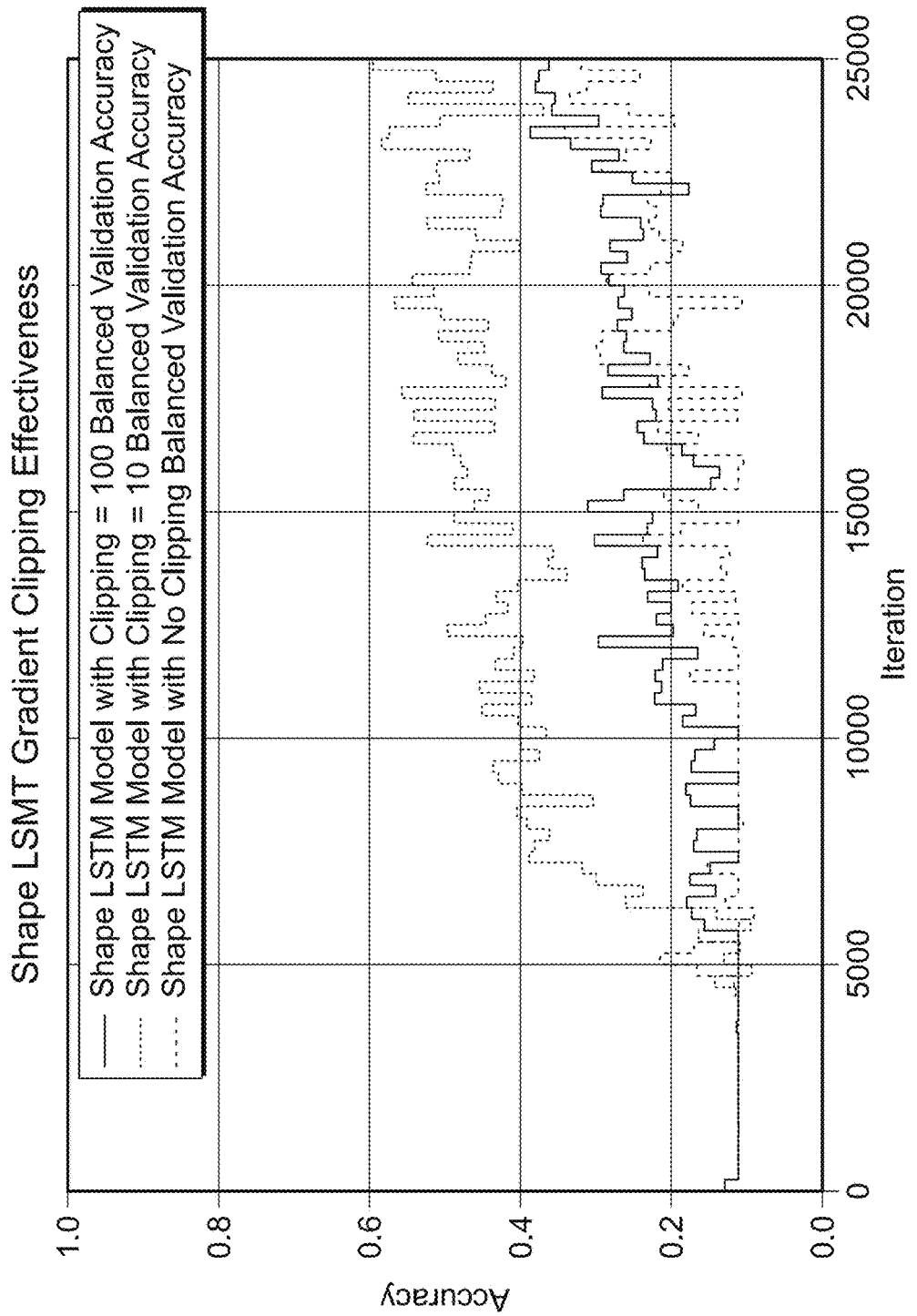
FIG. 12 is a chart illustrating balanced validation accuracy on the shape LSTM model with different clipping value of the gradients.

FIG. 12 illustrates balanced validation accuracy on the shape LSTM model. By tuning the clipping value of the gradients it was able to achieve a higher balanced validation accuracy compared to poorly tuned or no clipping values.

In order to combat the exploding gradient problem, different clipping values for the gradient were tested. If the network tries to change its parameters by a gradient with a norm larger than the clipping value, the gradient is scaled to have a norm equal to the clipping value. By tuning this hyper-parameter appropriately the learning efficiency and accuracy of the models were increased, as seen in FIG. 11 and FIG. 12 respectively.

Figure 13:
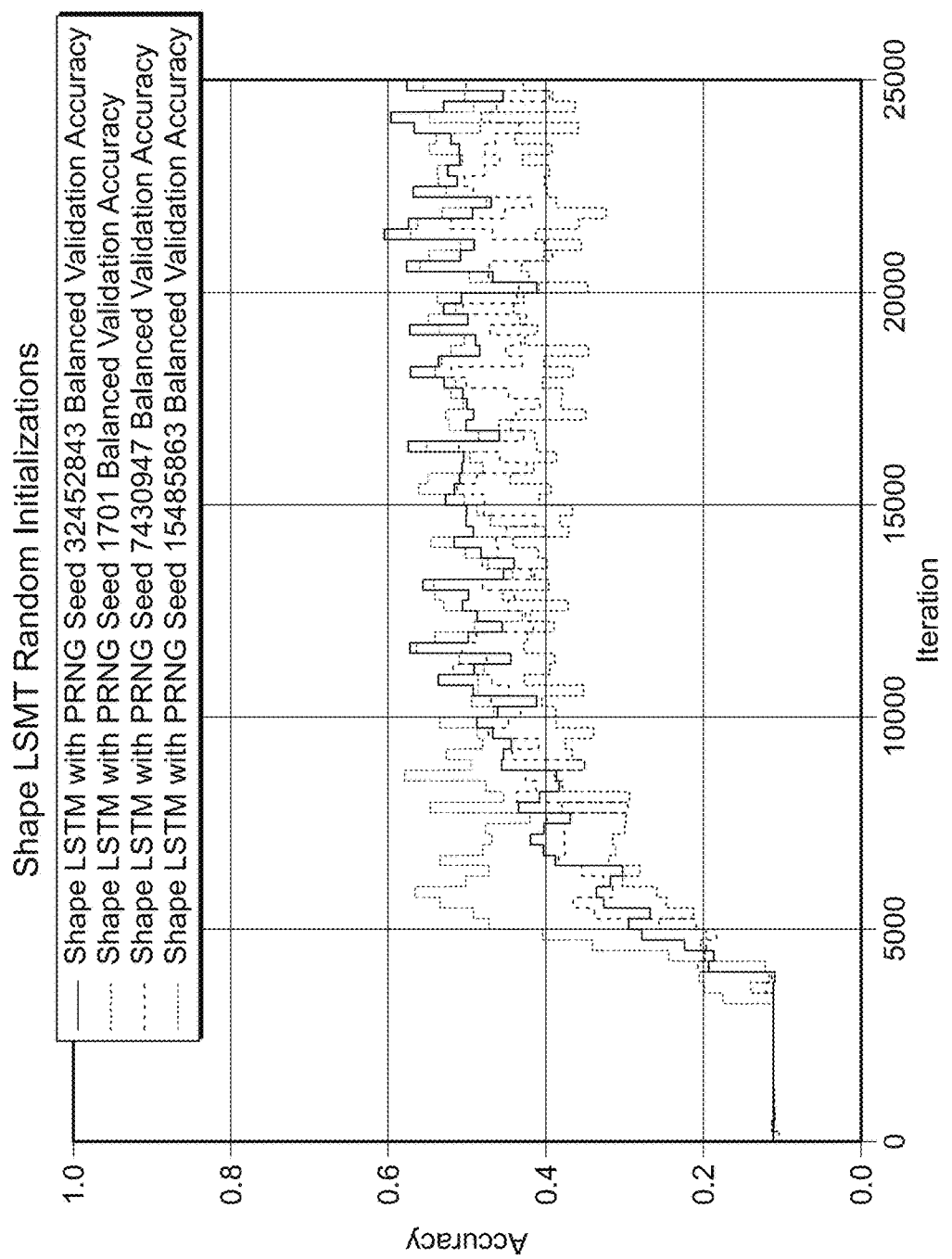
FIG. 13 is a chart illustrating balanced validation accuracies for several trials of the shape LSTM model with different random initializations.

FIG. 13 illustrates balanced validation accuracies for several trials of the shape LSTM model with different random initializations. Depending on where the solver starts it can be confined to a lower accuracy for a great length of time or quickly reach a higher one.

Unless pre-trained values are specified all of the model weight parameters are initialized to values sampled from a Gaussian distribution with zero mean and standard deviation 0.01, while all the bias parameters are initialized to zero or one. Because of the highly nonlinear nature of the error space of these models, starting in a new random location can place the model near different local minima and thus significantly impact learning performance. This is clearly the case as FIG. 13 shows.

In order to select the best hyper-parameters cross validation on the eight expert-annotated videos was used. For all of the results in this section the following hyper-parameters were used: an inverse learning policy with b=0.01, $\gamma$=0.01, $\epsilon$=0.472, a gradient clipping value of 10, a random seed of Ser. No. 15/485,863, the RMSProp solver with $\mu$=0.92, and batch normalization. While several models did not perform nearly as well as the current system, others were able to achieve a higher balanced validation accuracy. The accuracies reported are taken at the training iteration with the highest validation accuracy.

As seen in Table 1, pre-training has a significant boost in accuracy over randomly initializing the model parameters. Additionally it outperforms the existing classification system when pre-training with shape and motion features. Having already been trained on so many other images, the parameters should be at a local optima in the error surface of the model that can be used to boost the accuracy of the shape component of the model.

TABLE I

|  | Random Initialization | Pre-training |
|---|---|---|
| Shape | 62.9% | 72.0% |
| Shape & Position | 60.9% | 68.6% |
| Shape & Motion | 78.2% | 83.6% |
| Shape, Motion & Position | 77.1% | 76.8% |

Even when pre-training, some actions are still commonly confused, such as sniffing versus walking and grooming and sniffing. They pose a challenge for the dataset because the mice often perform both at the same time or they look quite similar, so it can be difficult to distinguish when a human would label the action as one versus the other.

Figure 14:
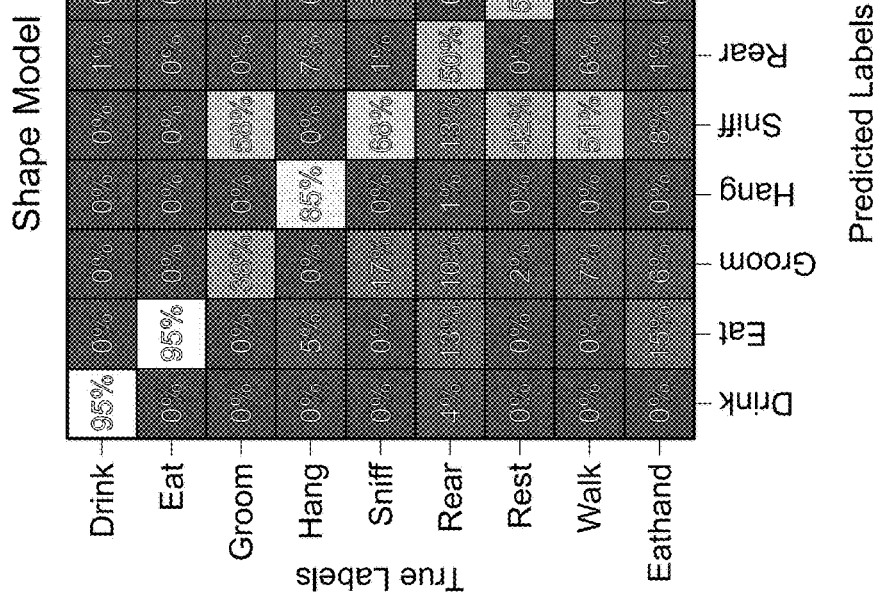
FIG. 14 is a confusion matrix for the shape model.

Referring to FIG. 14, a confusion matrix is illustrated for the shape model. While eating and drinking are very accurate it often confuses grooming and sniffing. This is expected because these misclassified behaviors are very dependent on the motion of the mouse, which this model does not explicitly know. Additionally, the model struggles to classify more basic, shape based actions as accurately as it does when using pre-training, which is again expected because we are randomly initializing the weights here instead of starting from known, useful values.

Figure 15:
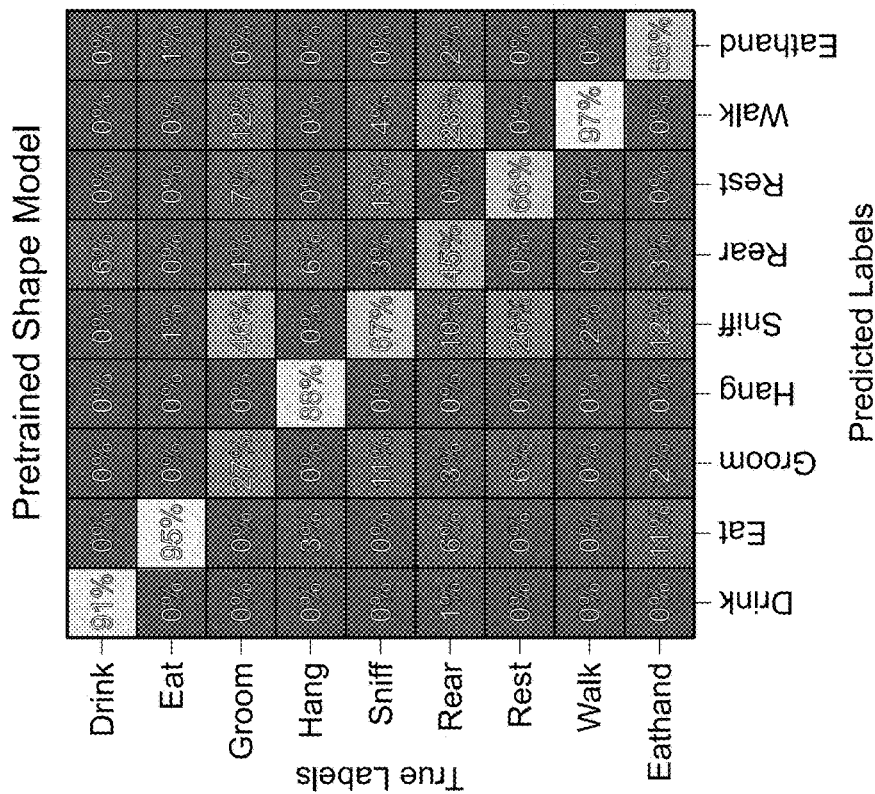
FIG. 15 is a confusion matrix for the shape model initialized with convolution layer weights from a pre-trained AlexNet network.

Referring to FIG. 15, a confusion matrix is illustrated for the shape model initialized with convolution layer weights from a pre-trained AlexNet network. Clearly this has a substantial improvement over the randomly initialized shape model, yet it still fails to properly classify many motion-based actions such as groom and sniff. While it achieves a balanced validation accuracy of 72.0%, most of its accuracy is concentrated in a few classes that are easier to discern from shape alone.

Figure 16:
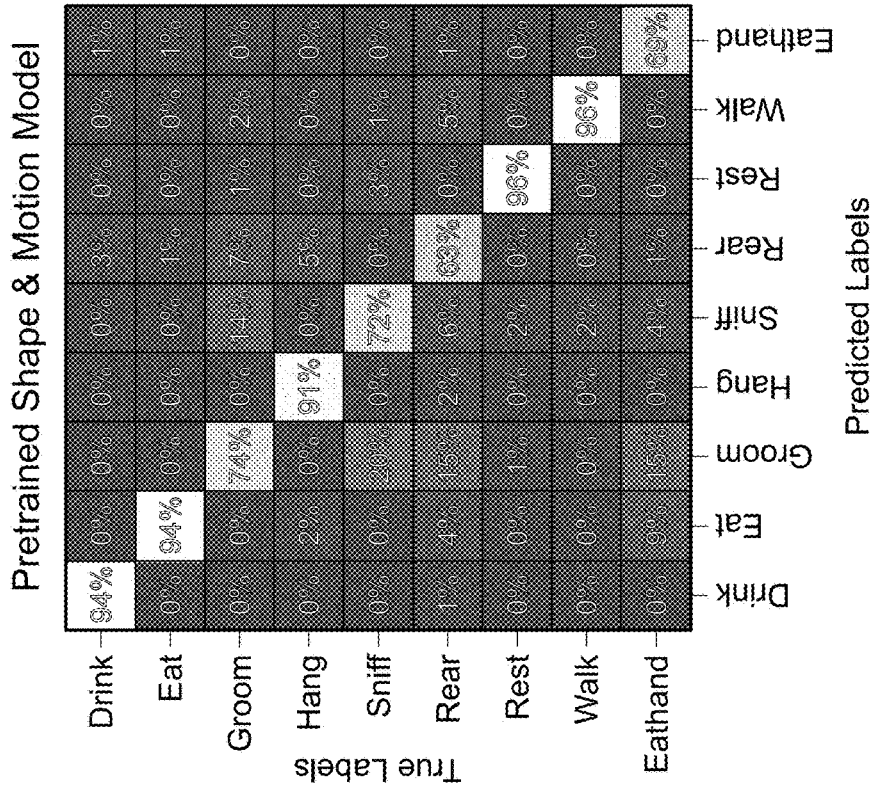
FIG. 16 is a confusion matrix for the shape model combined with motion features, initialized with convolution layer weights from a pre-trained AlexNet network.

Referring to FIG. 16, a confusion matrix is illustrated for the shape model combined with motion features, initialized with convolution layer weights from a pre-trained AlexNet network. This model achieves a balanced validation accuracy of 83.6%, scoring better than the existing classification system with high accuracies across all classes. While it does still make some mistakes between sniffing and grooming these are often also confused by human annotators.

Figure 17:
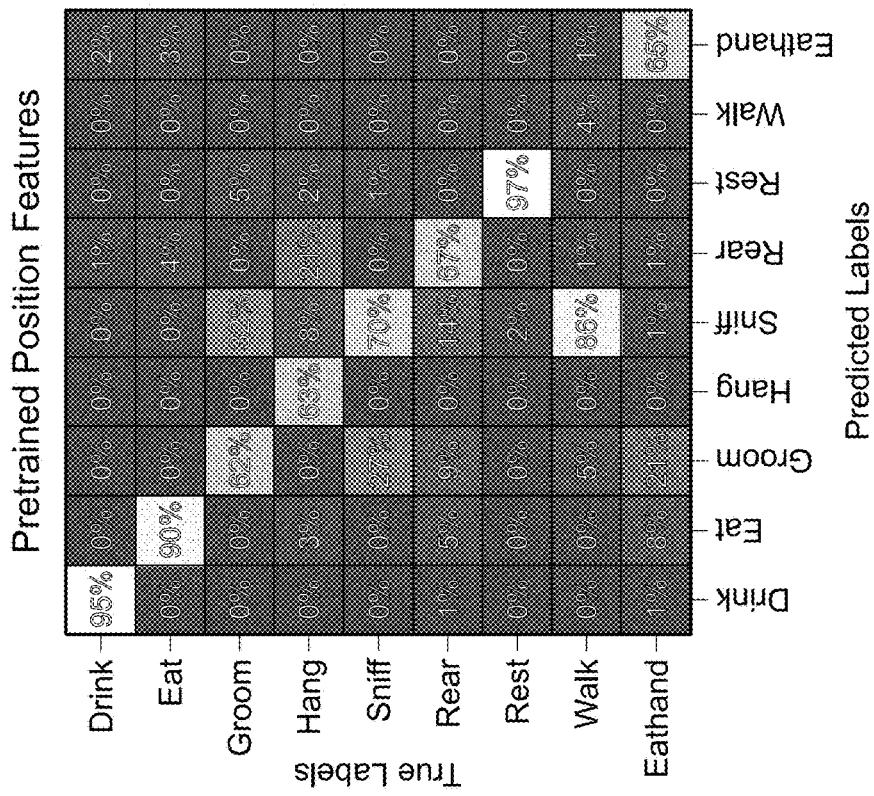
FIG. 17 is a confusion matrix for the shape model combined with position features, initialized with convolution layer weights from a pre-trained AlexNet network.

Referring to FIG. 17, a confusion matrix is illustrated for the shape model combined with position features, initialized with convolution layer weights from a pre-trained AlexNet network. While this still is quite accurate for several actions, it still fails to classify many motion based classes as accurately as using motion features alone. It can still differentiate actions such as resting from others when the mouse has the same shape but different large scale movements, yet cannot accurately classify actions with the same shape and large scale movements but different smaller motions such as sniffing versus walking.

Figures 18, 19:
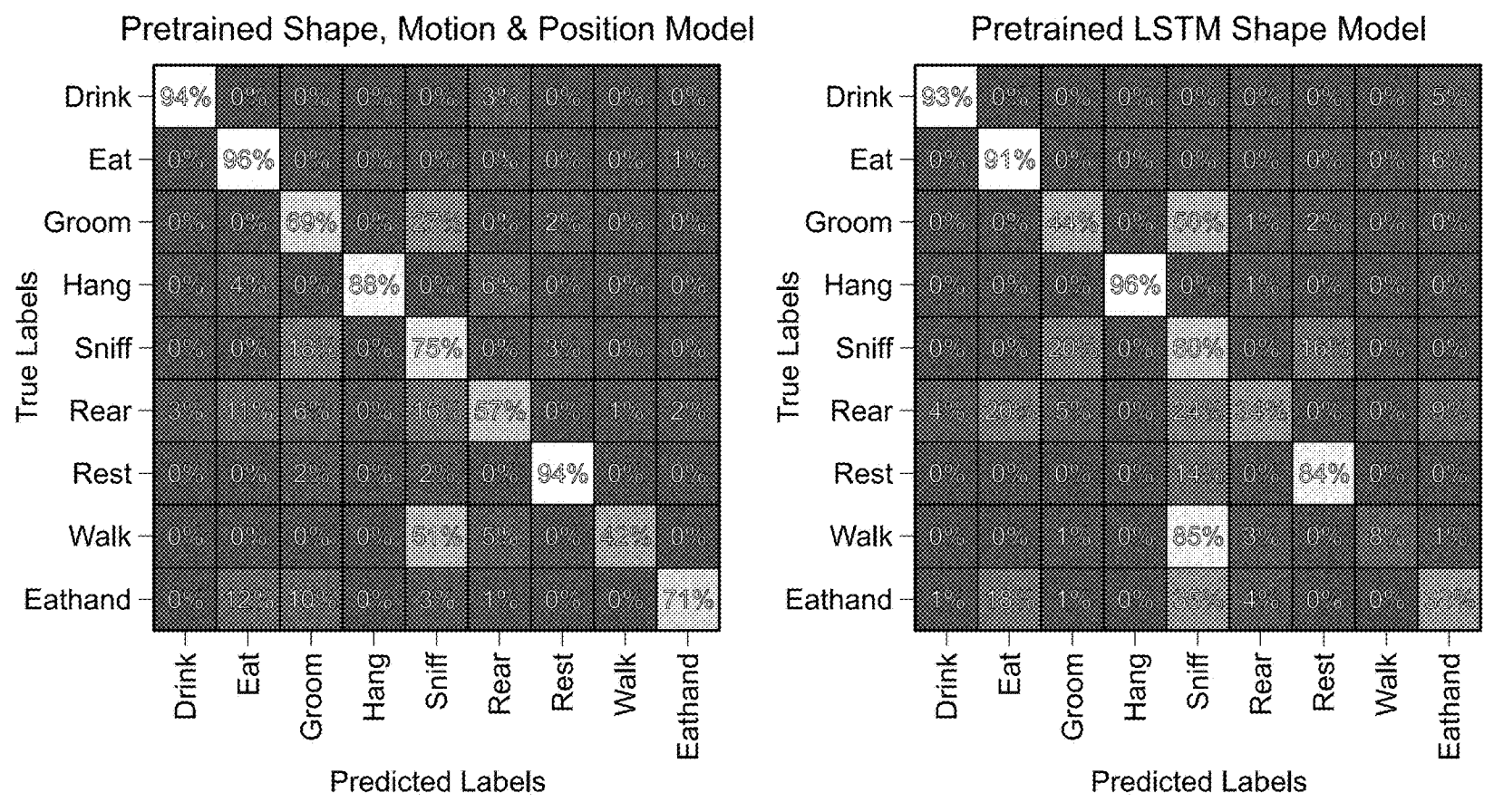

Referring to FIG. 18, a confusion matrix is illustrated for the shape model combined with motion and position features, initialized with convolution layer weights from a pre-trained AlexNet network. It particularly fails to discern sniffing from walking, which the shape and motion model did very well. This is clear evidence that the position features are confusing the system, as the motion information to indicate that sniffing is occurring is present yet because the mouse is walking and sniffing in many different locations and directions the model fails to classify it well due to overfitting.

Given that several mouse actions differ only in the small movements it is performing, the overall shape of the mouse will not give much useful information for these classes. FIG. 16 shows that once the motion features are included the model can better differentiate sniffing and grooming, significantly improving the accuracy of classification overall and outperforming the current system.

While it was expected that as with the current system the model would see an increase in accuracy when combining it with position features, there was actually some decrease in performance. Compared to a balanced validation accuracy of 72.0% with shape alone as seen in FIG. 15, there is a dip in performance to 68.8% when inserting position features as seen in FIG. 17. This is believed to be because the model is overfitting to the position training data; it is becoming accustomed to the mouse performing actions in certain positions in the cage, and when these position change in the test data the system fails to classify properly. A similar scenario is seen when including both motion and position, comparing the 83.6% accuracy seen in FIG. 16 with the 76.8% seen in FIG. 18.

Pre-trained weights the recurrent models did outperform the non-recurrent ones, yet more often they was surprisingly less effective. See Table 2 for a complete comparison of model types. This is believed to again be because the models were overfitting to the training data; it takes massive amounts of samples to properly train the many pieces inside LSTM units, and because they are randomly initialized it is unlikely that there are many meaningful values to start with. More training data is being collected to satisfy this requirement, at which point it is expected they will perform much better. The LSTM confusion matrices seen below are using a sequence length of two, in order to mimic the order two HMM used in the current system. Sequence depths of ten and thirty were also used, but did not show any significant impacts on performance.

Additionally, in general it appears that inserting the position features before the LSTM layer has a greater effect compared to inserting them after. This could be because the LSTM layer is actually learning the transitions between the larger scale motions of the mouse, which would improve classification accuracy on several action classes.

Referring to FIG. 19, a confusion matrix is illustrated for the shape LSTM model initialized with convolution layer weights from a pre-trained AlexNet network. With a balanced validation accuracy of 61.5% it is significantly worse than the 72.0% achieved without the LSTM, which is believed to be from overfitting to the training data.

Figure 20:
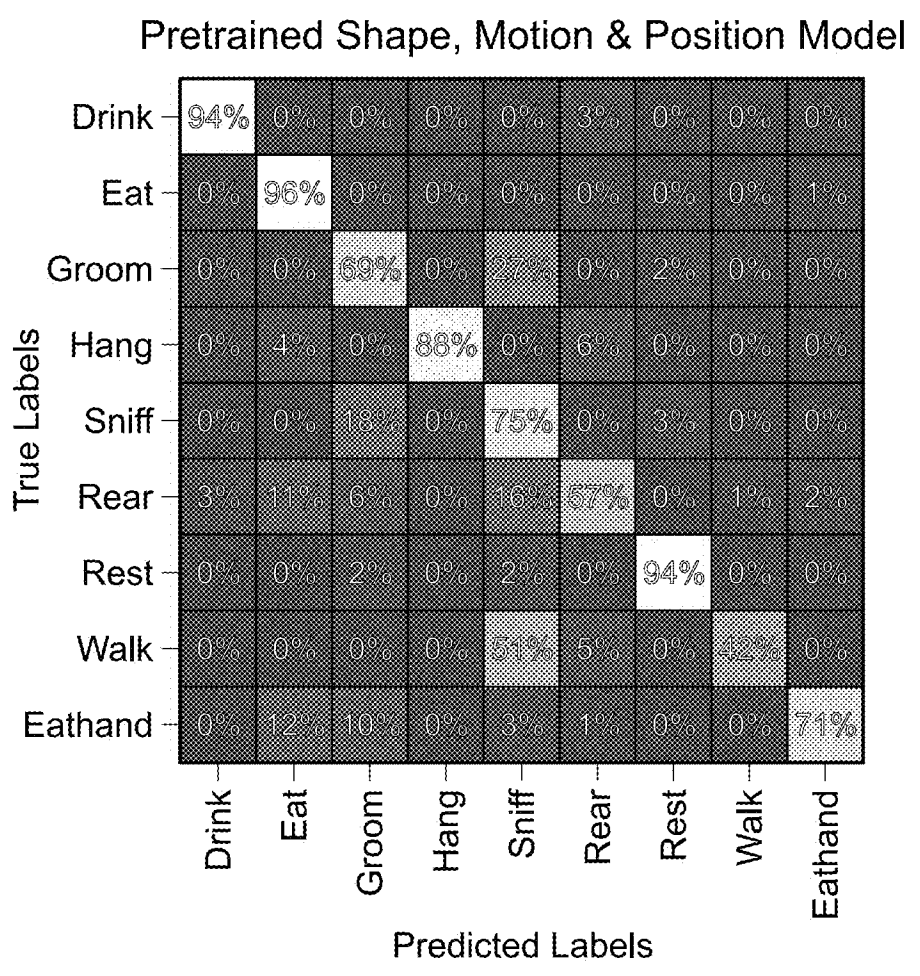

Referring to FIG. 20, a confusion matrix is illustrated for the LSTM model with shape, motion and position features initialized with convolution layer weights from a pre-trained AlexNet network. The position features here were inserted after the LSTM layer. While this model is still accurate across most classes and even outperforms the same model without the recurrent layer, it has an overall lower balanced validation accuracy of 81.4% compared to the 83.6% achieved by the non-recurrent shape and motion model.

Table 2 summarizes the balanced validation accuracies of the model trials. The LSTM models were run with a sequence length of two, and the LSTM(before) and LSTM (after) columns specify if the position features were included before or after the LSTM layer of the model.

|  | CNN | LSTM (before) | LSRM (after) |
| --- | --- | --- | --- |
| Shape | 65.5% | — | 69.2% |
| Motion | 79.8% | — | 79.3% |
| Motion & Shape | 77.8% | — | 75.6% |
| Shape & Motion | 78.2% | — | 72.3% |
| Shape & Position | 60.9% | 70.9% | 70.4% |
| Shape & Pre-train | 72.0% | — | 61.5% |
| Shape, Motion & Position | 77.1% | 78.9% | 74.0% |
| Shape, Motion & Pre-train | 83.6% | — | 79.4% |
| Shape, Position & Pre-train | 68.6% | 75.4% | 70.4% |
| Shape, Motion, Position & Pre-train | 76.8% | 71.2% | 81.4% |

Therefore it can be seen that the present method and system of automating behavioral classification that is improved over the prior art, by not only providing a higher accuracy of classifications, but also providing a system that can adapt to the study's environment and is capable of generalizing to new types of experiments. The system further does not have to rely on error-prone series of analysis such as background subtraction, feature extraction, and classification as the system is able to learn a single end-to-end classification system. Therefore the system and method, in addition to increasing the robustness of setups, is also easier for scientists tom implement in a variety of experimental setups.

It would be appreciated by those skilled in the art that various changes and modifications can be made to the illustrated embodiments without departing from the spirit of the present invention. All such modifications and changes are intended to be within the scope of the present invention.

What is claimed is:

1. A method of automated behavior classification of a plurality of test subjects, comprising:
   providing video of a test subject;
   annotating the video of the test subject with a plurality of behavior classifications corresponding to a behavior of a test subject in the video at a point in time, thereby creating annotated video;
   storing the annotated video;
   training a neural network with the annotated video to identify a relationship of the test subject in the video with the annotated behavior classification for that test subject at that point in time in the annotated video; and
   with the trained neural network, classifying behavior of a plurality of test subjects from a plurality of videos.

2. The method of claim 1, wherein the relationship comprises a shape of the test subject.

3. The method of claim 1, wherein the relationship comprises a motion of the test subject.

4. The method of claim 1, wherein the relationship comprises a position of the test subject.

5. The method of claim 1, further comprising pre-training the neural network by providing predetermined weight and bias values to the neural network.

6. The method of claim 1, wherein the neural network comprises a convolution neural network.

7. The method of claim 6, wherein the neural network comprises a plurality of convolution layers interspersed with a plurality of pooling layers.

8. The method of claim 6, wherein the neural network further comprises a plurality of fully connected convolution layers.

9. The method of claim 6, wherein the neural network further comprises a recurrent neural network layer.

10. The method of claim 9, wherein the recurrent neural network layer comprises an LSTM layer.

11. The method of claim 10, wherein the LSTM layer is intersperse within the fully connected convolution layers.

12. A method of automated behavior classification of a plurality of test subjects, comprising:
    providing a neural network trained to identify a plurality of observable behaviors in test subjects;
    providing video of a plurality of test subjects to the neural network;
    with the neural network, identifying the observed behaviors of the test subjects in the video,
    annotating the time the observed behavior occurred, thereby creating an annotated video; and
    storing the annotated video.

13. The method of claim 12, wherein the neural network is configured to identify a shape of the test subject.

14. The method of claim 12, wherein the neural network is configured to identify a motion of the test subject.

15. The method of claim 12, wherein the neural network is configured to identify a position of the test subject.

16. The method of claim 12, wherein the annotations comprise a label indicating the observed behavior.

17. The method of claim 12, wherein the annotations comprise a timestamp indicating the time the observed behavior occurred in the video.

18. The method of claim 12, further comprising creating a log of a time the observed behavior occurred and a type of observed behaviors that the test subject made in the video.

* * * * *